United States Patent [19]

Hildenbrandt

[11] E Re. 29,017

[45] Reissued Oct. 26, 1976

[54] ILLUMINATION SYSTEM FOR COPIER MACHINES ARRANGED TO MINIMIZE GLARE WITH RESPECT TO AN OPERATOR

[75] Inventor: Leon H. Hildenbrandt, Boulder, Colo.

[73] Assignee: International Business Machines Corporation, Armonk, N.Y.

[22] Filed: Apr. 16, 1975

[21] Appl. No.: 568,753

Related U.S. Patent Documents

Reissue of:

[64] Patent No.: 3,758,774
Issued: Sept. 11, 1973
Appl. No.: 264,093
Filed: June 19, 1972

[52] U.S. Cl. ..... 240/41.35 R; 240/103 R; 355/67

[51] Int. Cl.[2] ..... F21S 1/00; G03B 27/54

[58] Field of Search ..... 355/67, 66, 49, 8, 51; 353/50, 98; 240/103, 41 R, 41.35; 350/6

[56] References Cited

UNITED STATES PATENTS

| | | | |
|---|---|---|---|
| 247,589 | 9/1881 | Wheeler | 240/103 R |
| 1,981,328 | 11/1934 | Rivier | 240/41 R |
| 2,206,169 | 7/1940 | Eisenhut | 350/6 UX |
| 2,252,246 | 8/1941 | Bergmans | 353/98 X |
| 2,860,557 | 11/1958 | Moore et al. | 355/66 X |
| 3,492,474 | 1/1970 | Yamaguchi | 240/103 R |
| 3,520,586 | 7/1970 | Bousky | 350/6 |
| 3,594,081 | 7/1971 | Tschink | 355/67 |

FOREIGN PATENTS OR APPLICATIONS

| | | | |
|---|---|---|---|
| 575,449 | 5/1959 | Canada | 355/8 |
| 1,560,172 | 3/1969 | France | 355/67 |

OTHER PUBLICATIONS

Bruce, G. D. et al., "Dual–Mirror Document Scanning System", IBM Technical Disclosure Bul., vol. 14, No. 6, p. 1791, (Nov. 1971).

Bersot, "Illumination to Eliminate Shadows", IBM Technical Disclosure Bul., vol. 15, No. 2, p. 521, (July 1972).

*Primary Examiner*—L. T. Hix
*Assistant Examiner*—E. M. O'Connor
*Attorney, Agent, or Firm*—John W. Girvin, Jr.; D. Kendall Cooper

[57] ABSTRACT

The present case is directed to a number of illumination systems making use of lamps and reflectors having predetermined optical configurations and arranged to insure minimal glare in the eyes of an operator using the equipment in which the illumination systems are incorporated. A first version involves a stationary paraboloid reflector cooperating with a moving parabolic cylinder reflector to illuminate an original document during a copying operation. In a second version, the moving reflector is split into two reflectors each having distinct parabolic configurations and different focal lengths. In still another version, only a single reflector is arranged for movement during scanning of an original document to project a line of light and has a predetermined configuration which is paraboloid in one direction and substantially elliptical in a direction transverse to the first direction.

7 Claims, 9 Drawing Figures

ILLUMINATION SYSTEM FOR COPIER MACHINES ARRANGED TO MINIMIZE GLARE WITH RESPECT TO AN OPERATOR

Matter enclosed in heavy brackets [ ] appears in the original patent but forms no part of this reissue specification; matter printed in italics indicates the additions made by reissue.

REFERENCES TO PATENTS, PENDING APPLICATIONS, AND PUBLICATIONS OF INTEREST

Book: Calculus With Analytic Geometry having Angus E. Taylor and Charles J. A. Halberg, Jr. as authors; copyright 1969, published by Prentice-Hall, Inc. Note pages 85–91.

U.S. Pat. application Ser. No. 209,326, filed Dec. 17, 1971; having R. V. Davidge, et al., as inventors; and entitled: "Reproduction Apparatus Incorporating Alternate Redevelopment and Reimaging Cycles for Multiple Copies."

U.S. Pat. application Ser. No. 209,039, entitled "Electrophotographic Development Apparatus," Allison H. Caudill, inventor, filed Dec. 17, 1971.

BACKGROUND OF THE INVENTION, FIELD, AND PRIOR ART

A variety of illumination schemes have been provided in the prior art ranging all the way from simple aperture lamp arrangements, making use of no reflectors to more complex systems making use of a linear lamp position within an elliptical reflector and, in some cases, making use of additional reflecting members to achieve projection of the light in a preferred direction. In some cases, a multiplicity of lamps have been arranged to illuminate an original document cooperating with a closely positioned reflector element that is coextensive with the lamps. Ordinarily, in any copier machine, when a flat document, such as original letters, and the like, are placed in position for copying purposes, little or no light is projected from the illumination system toward the operator's eyes. However, under circumstances where the original comprises a book or comparable original requiring special positioning or handling, prior systems are prone to project light toward the operator's eyes. This is due to the fact that the book or comparable original is positioned on the copy machine with the document lid in an open condition thereby permitting light to escape from the interior of the machine during the copying operation.

SUMMARY OF THE INVENTION

In accordance with the present invention, various illumination arrangements are provided that establish light patterns within pre-selected light boundaries not normally encountered by the operator of the machine. More specifically, reflector elements are provided in the illumination systems set forth therein that cooperate in various respects to establish an original document illumination pattern that is characterized as a directed column of light, also referred to as collimated in nature. With this arrangement, the chance that an operator of the machine will see the light emanating from the machine under normal conditions is extremely unlikely. This is true when original documents such as letters and the like are being copied with a document cover in place as well as under circumstances when books or other relatively large documents are being copied with the document cover moved out of position thereby exposing the illumination system. The principles set forth herein are applicable even when a very small original document is positioned for copying, or when in fact no document is in place but the illumination system happens to be on. The latter condition might occur, for example, during test procedures or the like.

As previously indicated, the invention is illustrated in several versions. In a first version, the illumination system includes a stationary paraboloid reflector having an associated light source that is preferably of compact design. Further, the first version includes a single parabolic cylinder scanning reflector arranged adjacent the original document for projection of a line of light during copy operations. The moving reflector receives collimated light from the stationary paraboloid reflector and focuses it to a line of light. In the second version, a stationary paraboloid reflector is also made use of but cooperates with a split parabolic scanning mirror arrangement, comprising two parabolic cylinder reflectors each having different focal lengths but focusing to the same line during scanning operations. An objective of this arrangement is to insure that light is provided from two directions, thereby minimizing or eliminating shadow effects that otherwise might be encountered with three-dimensional original objects.

In a third version, the illumination system includes a single moving reflector having both paraboloid and substantially elliptical characteristics. In this version, the reflector is preferably formed with a parabolic characteristic in one direction transversely to the direction of scanning with respect to the original document and that is substantially elliptical in cross-sections that are parallel to the direction of scanning.

Reference is made to the Taylor and Halbert book for some discussion of paraboloid and parabolic cylinder elements.

OBJECTS

A primary object of the present invention is to provide an illumination system that substantially eliminates glare projected toward the eyes of an operator in proximity to the system.

Another object of the invention is to provide an illumination system incorporating cooperating elements of compact design and achieving a more efficient illumination of objects.

Another object of the present invention is to provide an illumination system for projecting a line of light onto an original document in a copying machine.

A further object of the present invention is to provide an illumination system having a minimum of moving elements but producing a highly efficient light output for scanning of an original document in a copier machine.

Also, an object of the present invention is to provide an illumination system with some measure of control of light distribution in the system.

A still further object of the present invention is to provide an illumination system based on a unique arrangement of paraboloid and parabolic reflector elements.

An additional object of the present invention is to provide an illumination system having non-glare characteristics and utilizing a single reflector means for controlled light distribution.

An object of the present invention is to provide an illumination system that produces a more effective illumination pattern for particular use with three-dimensional objects.

The foregoing and other objects, features, and advantages of the invention will be apparent from the following more particular description of various embodiments of the invention as illustrated in the accompanying drawings.

IN THE DRAWINGS

Figure 3A:
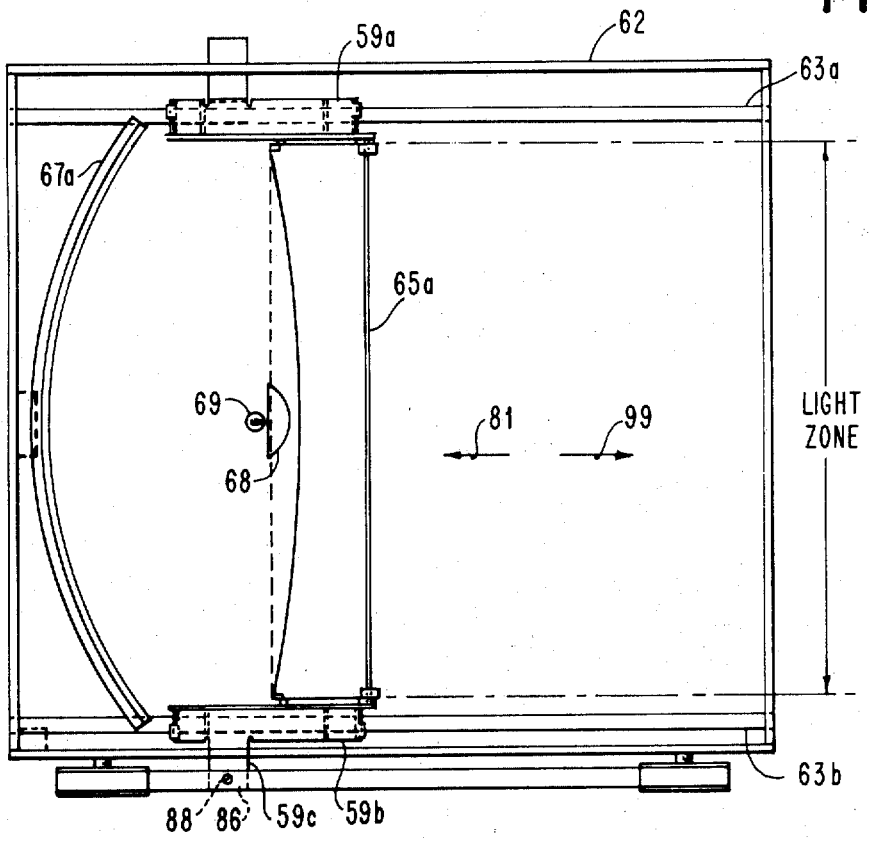
Figure 3B:
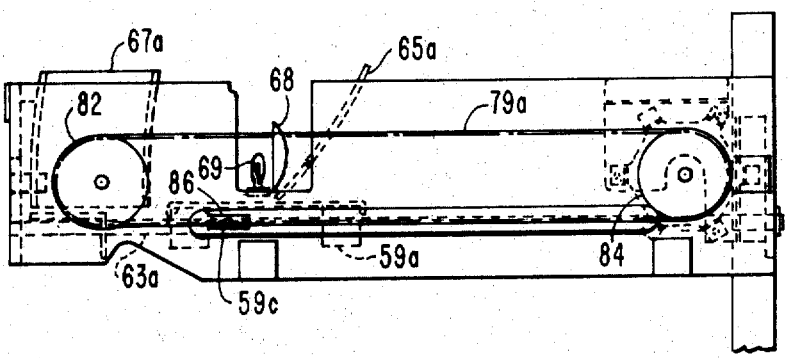
Figure 3C:
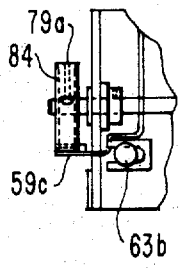

FIGS. 3a, 3b, and 3c together represent a first version of the illumination scanning arrangements previously referred to and particularly making use of a moving parabolic cylinder reflector.

Figure 4:
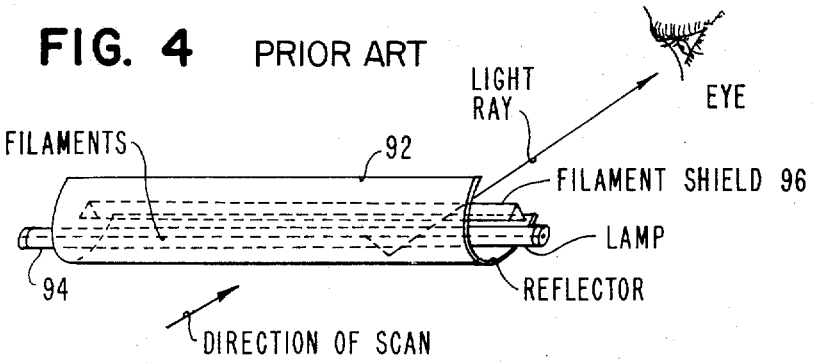
FIG. 4 PRIOR ART

FIG. 4 represents a typical illumination arrangement of the prior art utilizing an elliptic cylinder reflector with a linear light source.

Figure 5A:
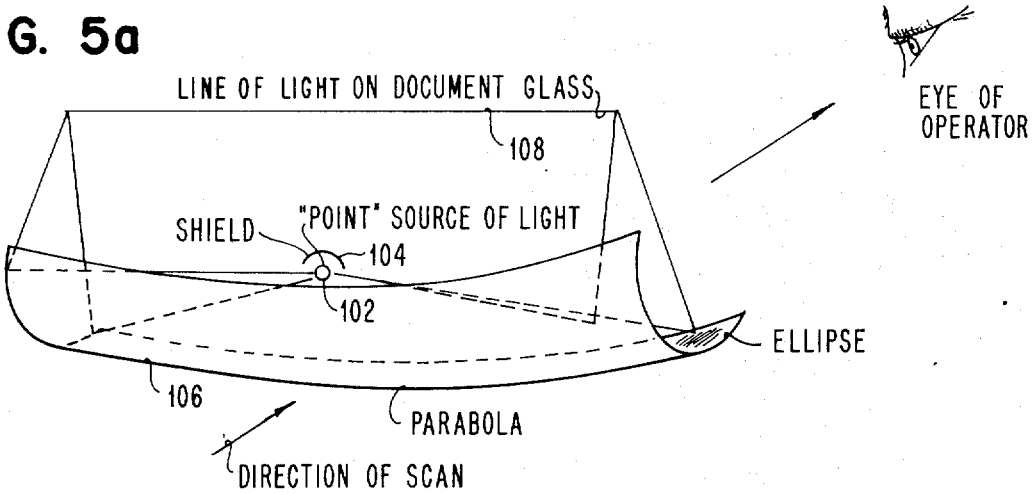
Figure 5B:
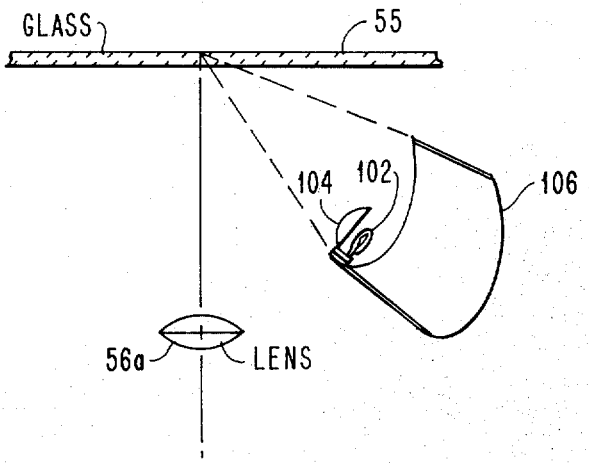

FIGS. 5a and 5b represent a third version of an illuminating scheme according to the principles of the present invention making use of a single moving reflector serving the same objective of the other versions, that is controlling the light from a substantially compact or near-point source of light to maintain the light within predetermined light projection boundaries in order to minimize or eliminate glare that might otherwise occur. In doing this, light is collimated as viewed in one plane and focused in a perpendicular plane.

GENERAL DESCRIPTION

Figure 1:
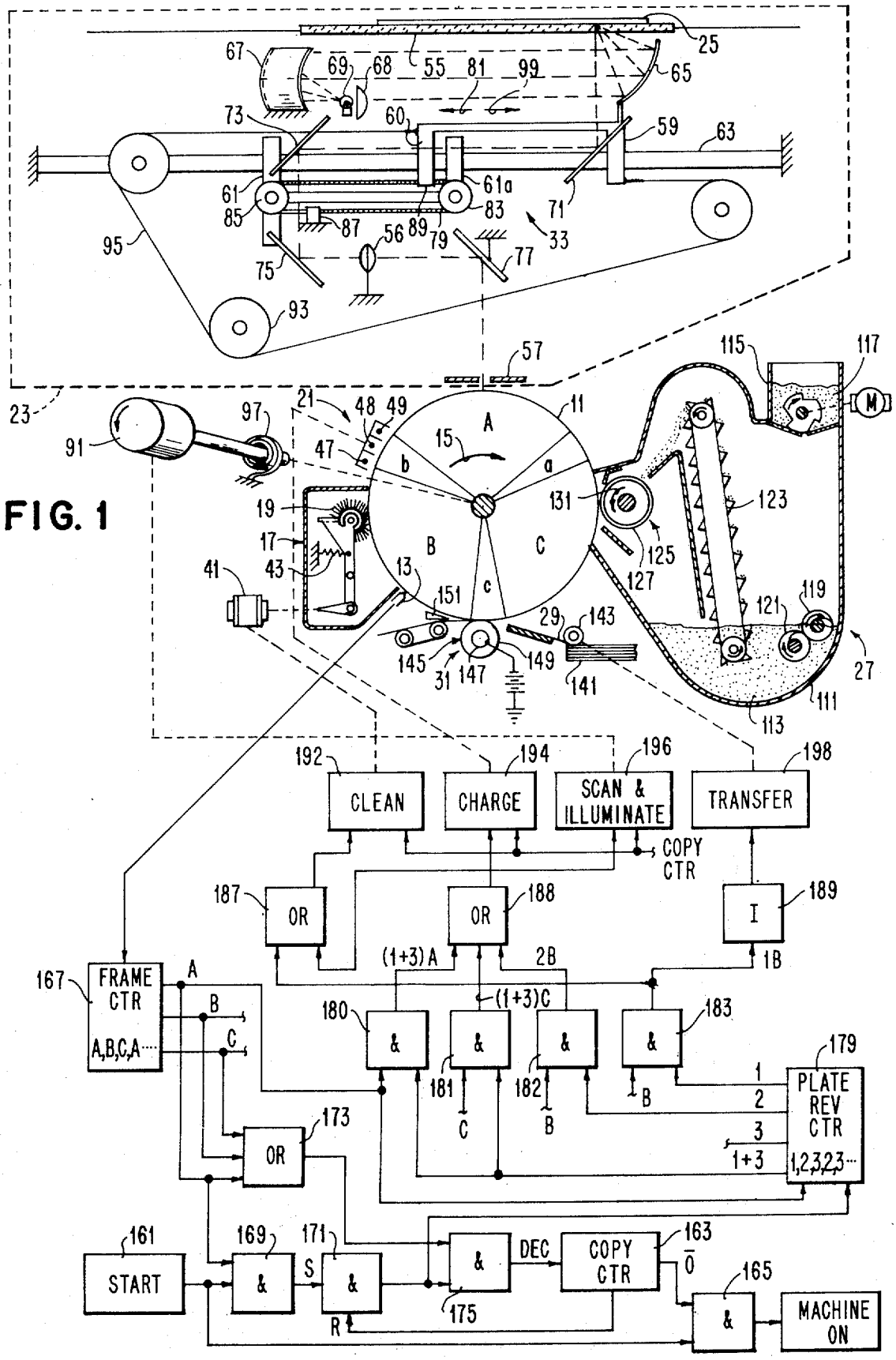
FIG. 1 is a schematic diagram of an electrostatic transfer reproduction apparatus incorporating a cyclic control unit for automatically effecting alternate redevelopment and reimaging cycles, and incorporating illumination means predicated on the principles of the present invention.

Referring now to FIG. 1 of the drawings, a continuously operating electrostatic transfer reproduction apparatus incorporating a first version of an illumination system is depicted. Although illustrated in conjunction with a particular copier apparatus, as taught in the Davidge, et al case, the illumination systems of the present invention are adaptable to many kinds of copiers and scanning systems.

Before discussing the illumination system, a general description of the copier apparatus shown is in order. The copier apparatus comprises a plurality of processing stations located about a cylindrically shaped photosensitive electrostatic plate of drum member 11. Drum member 11 comprises a layer of photoconductive material superimposed over a conductive backing. A suitable photoconductive material is disclosed in U.S. Pat. No. 3,484,237, issued Dec. 16, 1969. Member 11 is divided into three segments or frames designated A, B, and C. The frames are separated from one another by interframe or intersegment gaps a, b, and c.

A sensing device 13 senses permanently recorded signals within the interframe gap portion of the electrostatic place and supplies logical signals to a cyclic control apparatus to be described hereinafter indicating the positional relationship of the various frames with respect to the various processing stations, as the electrostatic plate rotates in the direction of arrow 15 past the processing stations. The electrostatic plate 11 first passes a cleaning station 17 having an actuable cleaning member 19 located therein. When actuated, the cleaning member 19 brushes the surface of the electrostatic plate 11 removing any foreign material including developer material therefrom. The plate then passes an actuable charging station consisting of a corona generating device 21 which sensitizes the electrostatic plate 11 as it rotates therepast. Thereafter, the electrostatic plate passes an imaging station 23 which, when actuated, projects a light image of a master 25 onto a frame segment of member 11 rotating thereunder. The projection of the light image onto the sensitized electrostatic plate creates a latent electrostatic image thereon which rotates with member 11 as it passes the developer station 27. At the developer station 27, multicomponent developer material including an electrostatically charged toner is applied to the surface of the electrostatic plate containing the electrostatic image thereon. The charged toner particles are preferentially attracted to the latent image on the plate 11 and are subsequently transferred to a substrate surface 29 at the transfer station 31.

As will be described hereinafter, the frame containing the latent electrostatic image which had been imaged at the imaging station 23 is not cleaned at the cleaning station 17 as it again rotates therepast, nor is it charged at the actuable charging station 21 as it again rotates therepast. Further, as will be described, the imaging station 23 incorporates a moving optical projection system 33 which is reset to its initial position as the previously imaged frame rotates past the imaging station 23. Since the initial latent electrostatic image remains basically intact (that is, not being disturbed at the cleaning station 17 or the charging station 21 or re-exposed at the imaging station 23), the image is redeveloped at the developing station 27 and the thusly redeveloped image is transferred to a second substrate surface at the transfer station 31. Thereafter, the segment containing the image is cleaned at the cleaning station 17, charged at the charging station 21 and imaged with the same master 25 at the imaging station. The operation thus proceeds alternately imaging and redeveloping a previously imaged segment until the requisite number of copies of the master 25 have been produced.

In the description immediately following, the detailed operation of each of the processing stations located about the periphery of the electrostatic plate 11 will be described. Thereafter will follow a description of the cyclic control logic which effects the sequential operation of each of the stations as the electrostatic plate 11 rotates therepast.

The sensing device 13 senses indicia permanently recorded on the edge portion of the electrostatic plate 11 at the interframe gaps a, b and c. For example, this device could comprise a magnetic head adapted to read magnetic signals recorded on the edge surface of the plate. The output signal of this device is utilized to control the sequencing of the various stations to be described hereinafter.

The cleaning station 17 incorporates an actuable cleaning member 19 which moves from a position of close adjacency to the electrostatic plate 11 to a second position remote from the electrostatic plate 11. The cleaning member could, for example, comprise a cleaning brush well known in the art which intimately contacts the surface of the electrostatic plate 11 and rotates there against, thereby removing foreign material including toner from the surface of the plate when in its position of close adjacency thereto. The magnet and armature assembly 41 is actuated to drive the actuable cleaning member against the plate and the spring 43 returns the cleaning member to a position of nonadjacency to the plate when the magnet and armature assembly is deactuated. When in its position of nonadjacency to the plate, the actuable cleaning member 19 does not contact the surface of the plate, and therefore, the plate rotates therepast without interference therefrom.

The actuable charging station 21 comprises three corona generating wires 47, 48, and 49 which are sequentially turned on and off as the interframe gaps of the electrostatic plate 11 rotate therepast. For example, when the actuable charging station is turning on, the corona generating wire 47 is first energized as the first portion of an interframe gap rotates therepast. The corona generating wire 48 is then turned on as the same leading edge portion of the interframe gap rotates therepast, and thereafter, the corona generating wire 49 turns on as the leading edge portion of the interframe gap rotates therepast. Thus, any discontinuities in charge levels effected by turning on the corona generating wires appear within the interframe gap portions of the electrostatic plate 11. The same magnetic signal which is sensed by the sensing device 13 may also be utilized to actuate magnetically actuable switches to effect the sequential turn on and turn off of the corona generating wires 47, 48 and 49. The turn off sequence of the actuable charging station is identical to the turn on sequence.

The imaging station 23 comprises a fixed transparent document mounting means 55 onto which the master 25 to be copied is placed. A moving optical projection system 33 projects a progressive light image of the master 25 through the stationary lens 56 and aperture member 57 onto the electrostatic plate 11 rotating therepast. The moving optical projection system 33 includes a first carriage 59 and a second carriage 61, both mounted in telescopic fashion on a common track means 63 for reciprocal movement. The first carriage 59 supports a parabolic reflector 65 which cooperates with a stationary paraboloid reflector 67 to direct light from a lamp 69 upon an original document 25 through document mounting means 55 to thereby illuminate a segmental portion of the master 25. Lamp 69 has an associated reflector 68 for intensifying and directing light toward reflector 67. The arrangement is such that a moving line of light is projected onto document 25 during scanning. A scanning mirror 71 is also mounted on the first carriage 59 for receiving the image of the master thus illuminated.

The second carriage 61 supports a pair of compensating mirrors 73 and 75 which receive the image as reflected by the scanning mirror 71 and redirect the image to stationary mirror 77 through the lens 56 from whence the image is reflected through the stationary aperture member 57 onto the moving electrostatic plate 11. The first carriage 59 and the second carriage 61 are mechanically interconnected through a closed loop flexible cable 79 to cause the movement of the second carriage 61 to be one-half of that of the first carriage 59. By thusly moving the second carriage 61 by an amount equal to one-half the distance moved by the first carriage 59, a constant optical path from the document mounting means 55 through the mirrors 71, 73, and 75 to the lens 56, mirror 77 to the electrostatic plate 11 is maintained during the motion of the first carriage 59, and the second carriage 61 in the scanning direction of arrow 81. The flexible cable 79 is mounted on rollers 83 and 85 carried by the second carriage 61. A ground clamp 87 makes one point on the flexible cable 79 stationary at all times. The first carriage 59 is connected to an intermediate point of the cable 79 at point 89.

The motion in the scanning direction of arrow 81 is imparted to the first carriage 59 by the actuable drive motor 91 which is connected to the capstan 93 which is in turn connected to the cable system 95. As described heretofore, motion of the first carriage 59 in the direction of arrow 81 effects motion of the second carriage 61 through the flexible cable 79 so that the second carriage moves one-half the distance of movement of the first carriage. Upon completion of motion in the scanning direction of arrow 81, the first carriage 59 and the second carriage 61 are returned to their initial home positions by the spring motor 97 which effects rotation of the capstan 93 in an opposite direction thereby causing the cable system 95 to move the first carriage 59 in the direction of arrow 99. The second carriage 61 is returned by the action of member 60 of the first carriage 59 pulling the member 61a of the carriage 61 to its home position.

Summarizing, the scanning mirror 71 and an illumination system including lamp 69 and reflector 65 are driven by the capstan 93 in synchronism with the rotation of the electrostatic plate 11. As the scanning mirror 71 approaches the compensating mirror 73 thus tending to shorten the optical path, the compensating mirror 73 retreates at one-half the speed of the scanning mirror 71. Additionally, the compensating mirror 75 also moves with the compensating mirror 73 thereby creating a folded optical path which compensates for the tendency to shorten the optical path and maintains a constant optical path during the scanning operation. Accordingly, a light image of the master 25 is progressively projected onto a frame of the electrostatic plate 11 rotating past the aperture 57 creating a latent electrostatic image thereon. Once a complete frame section has been exposed, the lamp 65 is turned off and the first carriage 59 and the second carriage 61 are then driven to their home position under the control of the cable system 95. During the time that the optical system is returning and awaiting a new scan cycle, the next frame of the electrostatic plate 11 rotates past the aperture 57.

As the electrostatic plate 11 passes the developer station 27, electrostatically charged toner is applied thereto thereby developing the latent electrostatic image existing on the surface of the electrostatic plate 11.

The operation of the developer station 27 is generally described in the aforereferenced copending application of Allison H. Caudill. The developer station includes a sump portion 111 containing multicomponent developer material 33. The principle components of the developer material are electroscopic toner and a carrier material. Suitable materials for use as toners are well known in the art and generally comprise finely divided resinous materials capable of being attracted and held by electrical charges. Many well-known suitable carrier materials can be utilized, the carrier particles generally being between 50 and 1,000 microns in size. The carrier materials which are utilized for the developer station depicted must be ferromagnetic or capable of being attracted and held by a magnetic field. Such a carrier material could comprise a magnetic bead coated with a material which triboelectrically interacts with the selected toner to produce a desired charge on the toner in order to provide good imaging quality.

A tone dispensing unit 115 is provided to dispense toner particles 117 into the multicomponent developer material 113 located in the sump portion 111 of the developer station 27. Counter-rotating augers 119 and 121 stir the freshly added toner with developer material to assure complete mixing thereof.

A bucket conveyor 123 rotates through the sump portion 111 of the developer station 27 and scoops up quantities of developer material 113 for delivery to the magnetic brush unit 125. The magnetic brush unit includes a conductive, nonmagnetic, rotatable, cylindrical member 127 having located therein a magnetic field producing means 129. Since the core material of the carrier particles consists of a ferromagnetic material the carrier particles are caused to be magnetically attracted to the surface of the cylindrical member 127 and held thereon by magnetic forces produced by the magnetic field producing means 129. The cylindrical member 127 rotates in the direction of arrow 131 under a doctor blade 133 which governs the amount of developer material located on the surfaces of the cylindrical member 127 as it rotates to a position adjacent the electrostatic plate 11. As described in the aforereferenced copending application of Allison H. Caudill, the magnetic field producing means 129 creates a normal magnetic field at approximately the 9 o'clock position of the cylindrical member 127 causing the magnetic carrier particles in the developer material 113 to form in bristle-like arrays emanating from the surface of the cylindrical member 127.

The small toner particles of the developer material 113 are held onto the surface of the relatively large carrier particles by electrostatic forces, which develop from the contact between the toner and the outer surface of the carrier particles which produces triboelectric charging of the toner and carrier material to opposite polarities. A potential source (not shown) is connected to the cylindrical member 127 thereby biasing the cylindrical member to a fixed potential. As the magnetically formed bristles of carrier material containing toner triboelectrically attracted thereto rotate past and in contact with the electrostatic plate 11, the triboelectrically charged toner particles are attracted to the electrostatic latent image on the plate 11 and adhere thereto. The potential on the cylindrical member correctly orients the electrical field in which the charged toner particles move to produce a uniformly developed image on the surface of the plate 11. The electrostatic plate 11 containing a toned or developed image continues its rotational movement past the developer station 27 and continues to the transfer station 31. The carrier particles and the unspent toner particles attracted thereto are retained on the surface of the cylindrical member 127 until it reaches its approximate 6 o'clock position whereupon they are released into the sump portion 111 for subsequent mixing and reuse.

As the developed image on the electrostatic plate 11 moves from the developer station 27 toward the transfer station 31, a substrate surface such as paper is fed from the hopper 141 by the picker roll 143 which is actuated in timed relation to the rotational movement of the electrostatic plate 11.

The substrate surface 29 is fed over a feed path to the transfer roller 145. The transfer roller comprises a conductive core 147 and a dielectric outer layer 149. The conductive roll is biased so that the positively charged toner particles will separate from the electrostatic plate 11 and transfer to the support substrate 29. That is, an electric field is created between the grounded conductive backing member of the electrostatic plate 11 and the biased core 147 through the photoconductive surface of the electrostatic plate 11 and the insulating material 149 of the transfer roller 145. The toner particles move within this field to the support substrate 29 located between the electrostatic plate 11 and the transfer roller 145. Thereafter, the support substrate is removed from the surface of the electrostatic plate 11 by the pickoff means 151. The pickoff means 151 can comprise any of the well-known pickoff devices utilized in the duplicator art such as timed air puffs, stationary guide members, or movable guide members. The thusly separated substrate surface 29 containing a toned image is thereafter transported to a fuser station (not shown) where the toner is fused to the substrate in a well-known manner.

The description immediately preceding has related to the operation of each of the processing stations located about the rotating electrostatic plate 11. As described heretofore, various ones of these stations are sequentially actuated in accordance with the positional rotational relationship of the electrostatic plate 11 with respect to the fixed sensing device 13. The sequential actuation of the various stations facilities alternate imaging and redevelopment cycles. By utilizing such alternate imaging and redevelopment cycles, the throughput speed of the reproduction apparatus is increased since there is no longer a requisite delay time occasioned by the moving optical projection system 33 which must reset to an initial condition. Further, by limiting the number of redevelopment cycles, high quality output images are maintained.

When utilizing an electrostatic plate having three segments such as that depicted in FIG. 1 of the drawings, alternate segments are first imaged on the first rotation of the electrostatic plate and the electrostatic latent images created thereby are not thereafter substantially altered, thus allowing the latent image to be redeveloped on the second revolution of the electrostatic plate. The cleaning member and the charging station are actuated prior to imaging cycles and deactuated prior to redevelopment cycles. The following table summarizes a suggested cyclic operation of the cleaning, charging, imaging, and transfer stations.

TABLE I

| Plate Rev. | Frame | Clean | Charge | Image | Transfer |
|---|---|---|---|---|---|
| | A | Yes | Yes | Scan (image) | Yes |
| 1 | B | Yes | No | Return (no image) | No |
| | C | Yes | Yes | Scan (image) | Yes |

TABLE I-continued

| Plate Rev. | Frame | Clean | Charge | Image | Transfer |
|---|---|---|---|---|---|
| 2 | A | No | No | Return (no image) | Yes |
| | B | Yes | Yes | Scan (image) | Yes |
| | C | No | No | Return (no image) | Yes |
| 3 | A | Yes | Same as Rev. 1 | Same as Rev. 1 | Yes |
| | B | No | | | Yes |
| | C | Yes | | | Yes |
| 4 | A | Same as Rev. 2 | Same as Rev. 2 | Same as Rev. 2 | Same as Rev. 2 |
| | B | | | | |
| | C | | | | |

As can be seen from Table I, the operation on all even numbered plate revolutions is the same. After the first plate revolution, the operation of the device is the same for all odd-numbered plate revolutions, the only difference between plate revolutions 1 and 3 being the operation of the cleaning and transfer stations with respect to the B segment which does not go through a redevelopment cycle on the first plate revolution.

Referring once again to FIG. 1 of the drawings, the machine logic which effects the cyclic operation of the cleaning, charging, imaging and transfer stations is depicted in block form. The reproduction apparatus is started upon operator depression of a start control 161. The operator also sets a copy counter 163 indicating the number of reproductions of the master 25 which are desired. Assuming that a number of copies is specified, the copy counter 163 provides an output signal to the And gate 165 which provides a machine on signal. The machine on signal initiates the rotational movement of the electrostatic plate 11 in the direction of arrow 15 and initiates the various processing stations in a well-known manner (e.g., the bucket conveyor 123 is rotated). When the indicia located in the interframe gap, a, of the rotating electrostatic plate 11 is sensed by the sensing device 13, the frame counter 167 provides an output signal to the And gate 169 which in turn, sets latch 171. The frame counter 167 also provides an output signal to the Or gate 173 upon sensing the indicia located in the interframe gaps a, b, and c as they rotate past the sensing device 13. The output signal of the Or gate 173 and of the latch 171 are provided to the And gate 175 which, in turn, provides a signal to the copy counter 163 causing that counter to be decremented. Thus, the copy counter is decremented as each segment rotates past the sensing device 13. It should be noted that the copy counter is initially set with a number which exceeds the number specified by the operator by four. This is to insure that the first rotational pass of segment B, which produces no copy, is not counted and that the last counted segment rotates fully around to the transfer position. Thus, when the copy counter reaches a count of zero, the requisite number of copies have been reproduced and the machine is cycled off. It should further be noted that the output signal of the copy counter is utilized to prevent charging and scanning during the runout of the last copy.

The frame counter 167 also provides an output to the plate revolution counter 179 each time the interframe segment, a, passes the sensing device 13. The plate revolution counter provides an output signal indicating whether the electrostatic plate is in its first revolution past the sensing device 13 and, thereafter, whether the plate is in an even or odd-numbered revolution. The output signals of the plate revolution counter 179 and of the frame counter 167 are applied to the And gates 180–183 which, in turn, are applied to the Or gates 187 and 188 and the inverter 189. The output signal of the Or gate 187 is applied to the cleaning control 192. The cleaning control 192 is further provided with an input signal (not shown) indicating the precise rotational relationship of the electrostatic plate 11 with respect to the cleaning station 17. As a segment of the plate to be cleaned rotates past the actuable cleaning member 19, cleaning control 192 provides a signal to the magnet and armature assembly 41 causing the cleaning member to contact the electrostatic plate 11. The signal remains on until the entire segment has passed the cleaning member at which time the output signal of the cleaning control 192 is removed.

In a similar manner, the output signal of the Or gate 188 is provided to the charge control 194 which is also supplied with a timing signal (not shown) indicating the exact positional relationship of the interframe segment with respect to the actuable charging station 21. The charge control provides an output signal which effects the turn on or turn off of the corona generating wires 47, 48, 49 as the interframe segment rotates therepast.

The output signal of the Or gate 188 is also provided to the scan and illuminate control 196. This control is also provided with a timing signal indicating the exact positional relationship of the rotating electrostatic plate past the imaging station 23. The output signal of this device is supplied to the drive motor 91 which effects movement of the moving optical system in the scanning direction of arrow 81. Additionally, the output signal of the scan and illuminate control turns on the lamp 69 thereby illuminating the master 25. At the completion of a scan, the output signal of the scan and illuminate control is dropped, thereby causing the lamp 69 to be extinguished and the enabling signal to be removed from the drive motor 91. The spring motor 97 effects the return of the moving optical projection system 33 in the direction of arrow 99.

The inverter 189 provides an output signal to the transfer control 198 which is also provided with a signal indicating the positional relationship of the electrostatic plate 11 with respect to the transfer station 31. The output signal of the transfer control 198 effects the rotational operation of the picker roller 143, thereby causing a substrate surface 29 to be fed from the hopper 141 in timed relationship to the arrival of a developed image at the transfer station 31.

As described heretofore, the copy counter 163 provides a signal to the charge control 192 and to the scan and illuminate control 194 preventing, respectively, the charging and scanning of unwanted segments during a runout cycle. The same signal is provided to the cleaning control 192 which effects cleaning of those segments which rotate past the cleaning station during a runout cycle.

It should be noted that the timing signals indicating the exact positional relationship of the electrostatic plate 11 with respect to the various stations supplied to the cleaning control 192, the charge control 194, the scan and illuminate control 196, and the transfer control 198 may be provided by sensing devices similar to the sensing device 13 located at each station or by logic responsive to the sensing device 13 or by mechanical logic (e.g., cams, etc.) well known in the art. Further, the output signal of the cleaning control 192 may be held on through an appropriate electronic delay device or by a mechanical delay. Additionally, the charge control is depicted as being responsive to logic which turns on the actuable charging station 21. It should be noted that the absence of a signal from the Or gate 188 effects the turn off of the actuable charging station as an appropriate interframe segment passes thereunder.

ILLUMINATION SYSTEMS

The arrangement of the illumination elements in all three versions of the present invention is such that a line of light is projected toward an original document, or object, the line of light having a predetermined finite length confined within a light zone not normally encountered by an operator of the equipment. The principles may be best understood by reference to the detailed drawings 2a–5b.

FIRST VERSION

Figure 2A:
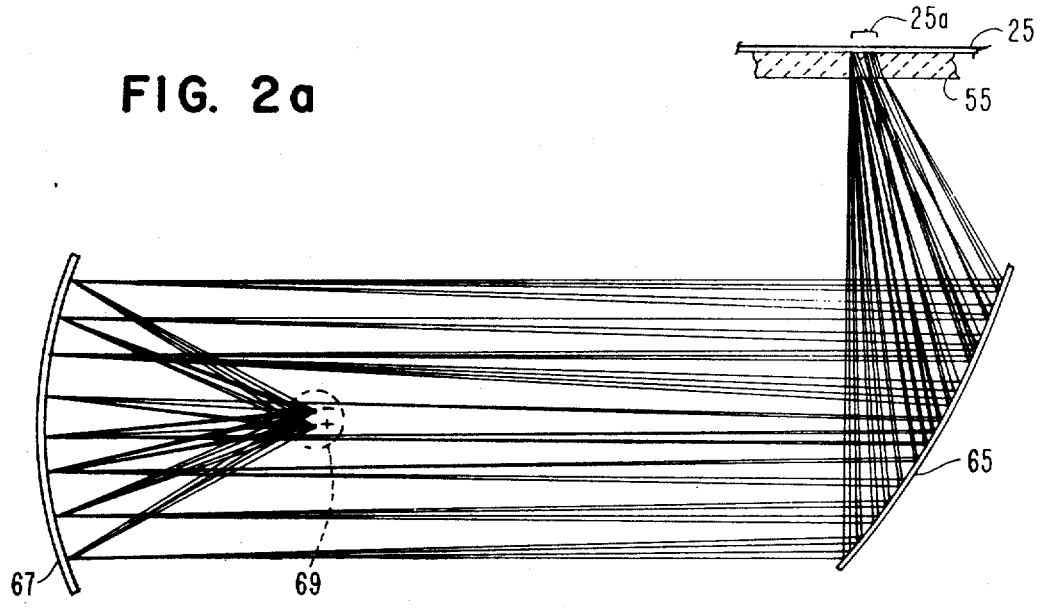
FIG. 2a represents tracings of light rays from an original light source to a stationary paraboloid reflector to a moving parabolic reflector, thence through a document glass to an original document.

In the first version, a stationary paraboloid reflector element 67 receives light from lamp 69, projects the same toward parabolic reflector 65 which in turn reflects the light toward the original document. The two reflector elements 65 and 67 cooperate in such a manner that a line of light of finite width and length is obtained. The typical tracings of light from source 69 are shown in FIG. 2a. The light is projected toward paraboloid reflector 67 that serves to collimate the light as it is directed toward parabolic reflector 65. Parabolic reflector 65 in turn, is designed with a focal line that produces a line of light of predetermined width in area 25a of document 25. Further understanding of the first version may be had by reference to FIGS. 3a, 3b, and 3c representing a top elevation, side elevation, and partial end elevation of an illumination scheme similar to that shown in FIG. 1 but differing in a number of aspects. Where appropriate, identical reference numerals are used in FIGS. 3a–3c that correspond, respectively, with numerals in FIG. 1. When illumination of a document is required, lamp 69 is energized and light is projected toward paraboloid reflector 67a that is stationarily mounted in the apparatus. Spherical reflector 68, which has a reflective inner surface, serves to prevent direct light emanating from lamp 69 from going into the light zone, and also improves the efficiency of the system by re-directing light back toward lamp 69. The reflector 67a serves not only to collimate the light within predetermined vertical dimensions as shown in FIG. 2a as it is projected toward reflector 65, but further collimates the light from lamp 69 so that it remains substantially within the light zone in a horizontal plane, particularly shown in FIG. 3a. Thus, the shape of paraboloid reflector 67a is such that collimated light is produced in a two-dimensional sense, that is both vertically and horizontally. The dimensions of the arrangement are such that a relatively uniform level of illumination is maintained throughout the scanning range of movement of parabolic reflector 65, or 65a, as the case may be. As previously discussed in connection with FIG. 1, reflector 65 is mounted for travelling movement on carriage 59, more specifically designated as members 59a and 59b in FIG. 3a. Only so much of the driving and travelling mechanisms of FIG. 1 as are believed necessary for an understanding of the illumination system are shown in FIGS. 3a–3c.

The two-dimensional collimated light projected from reflector 67a, FIG. 3a, travels toward parabolic reflector 65a, throughout its range of movement. As shown in FIG. 3a, reflector 65a is in the home position and from such position travels toward the right within the bounds of frame number 62. As previously indicated in connection with FIG. 1, this is effected by sliding reciprocating movement of bearing members 59a and 59b on rods 63a and 63b, respectively. Also, as described in FIG. 1, the movement is evidenced by arrows 81 and 99.

While many of the elements shown in FIGS. 3a–3c are similar to those in FIG. 1, some differences exist. As an example, in FIGS. 3a–3c, carriage member 59b has an extension 59c extending into the path of movement of a drive belt 79a. Drive belt 79a is mounted on pulleys 82 and 84 for reciprocating movement as pulleys 82 and 84 are rotated. Ordinarily, a drive means, not shown, is connected to one of the pulleys 82 or 84 to rotate the same and drive belt 79a in a reciprocating fashion, evidenced by arrows 81 and 99. Belt 79a is provided with regularly spaced driving teeth, best seen in FIG. 3b, that engage correspondingly shaped segments on a clamp element 86. Clamp element is firmly interconnected to extension 59c with a portion of belt 79a passing therebetween through a screw connection 88. Due to the connections just described, reciprocating motion of reflector member 65a is effected.

It is evident that the arrangement of the first version, as well as others to be described, provides a highly efficient illumination system wherein light from a light source is controlled to produce a line of light having a finite width and finite length. If it is assumed that the top elevation of FIG. 3a conforms to the orginal document supporting area of a copy machine, it is readily understood that an operator while using the machine, would be standing under normal circumstances in a position that is on one or the other side of the light zone indicated in FIG. 3a. This being the case, the operator ordinarily sees no light emanating from the zone and glare is thereby eliminated. If per chance, as during testing procedures, the illumination system is operated and reflector element 65a reciprocated as indicated by arrows 81 and 99 with no original document in place and an associated document cover, not shown, out of the way, the operator would see only low intensity scattered light as scanning takes place.

SECOND VERSION

Figure 2B:
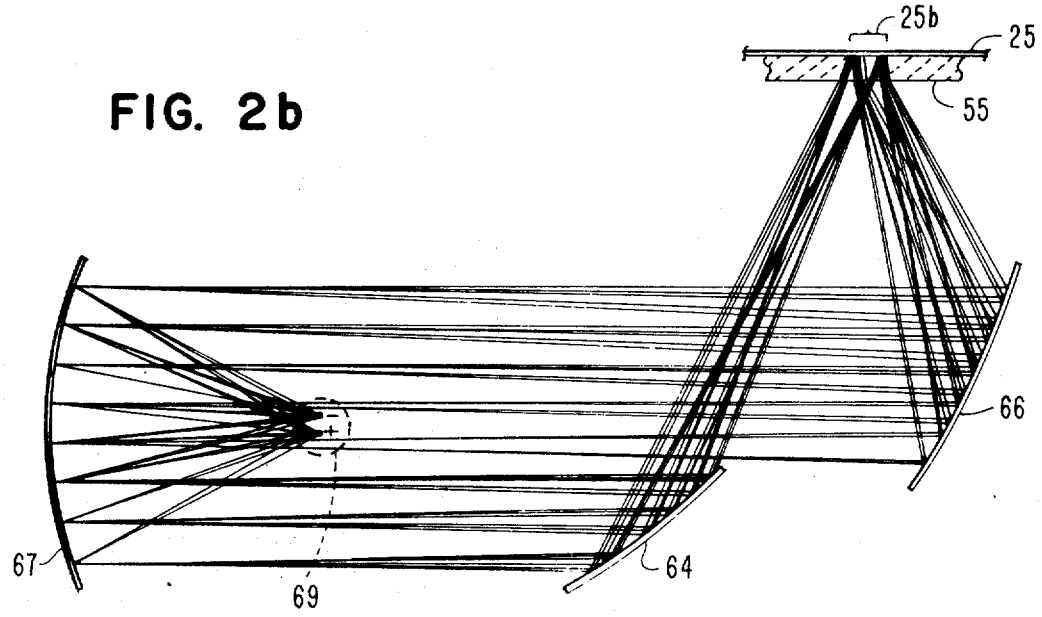
FIG. 2b is similar to FIG. 2a but is representative of light ray traces where a split reflector scheme is used involving two parabolic cylinders arranged for movement during scanning. This also illustrates the light being projected to an original document from two different angles to minimize shadow effects.

FIG. 2b illustrates a second version of the illumination system wherein the parabolic reflector 65 is replaced by a pair of parabolic reflections 64 and 66. Reflectors 64 and 66 receive collimated light from paraboloid reflector 67 but as can be observed in FIG. 2b, reflector 66 receives the upper portion of the collimated light while reflector 64 receives the lower portion of the collimated light. The positional relationships and preselected curvatures and angles of reflectors 64 and 66 are such that the collimated light is re-directed through document glass 55 to original document 25 and confined in an area 25b on document 25. The arrangement is such that better light distribution of a three-dimensional object in the area 25b can be achieved in this manner. In this case, it is understood that document 25 is representative of a three-dimensional object.

TYPICAL PRIOR ILLUMINATION SYSTEM

To further illustrate the advance represented by the present inventive arrangements, a prior illumination arrangement is illustrated in FIG. 4. This includes a reflector member 92, lamp 94 and filament shield 96. The direction of scan is also indicated. Although there is a filament shield 96 that prevents a direct path for light to project from the filament to the eye of an operator, the reflector 92 establishes a multitude of paths that are reduced in intensity only slightly, such as by one reflection loss level. Attempts to shield this kind of reflected light severely reduces the net illumination to a document or requires greater power to the lamp to achieve sufficient illumination.

THIRD VERSION

The problems encountered with the prior illumination arrangement of FIG. 5 are readily eliminated by use of the illumination arrangements taught herein, including the first and second versions. They may also be eliminated by use of the third version illustrated in FIGS. 5a and 5b. In this case, a compact source of light 102 cooperates with a shield 104 and a specially shaped reflector 106 to produce the line of light or light footprint shown on the line 108 having a finite width and finite length. The special characteristics of the reflector 106 are that it has a curvature that is parabolic when viewed in the scan direction indicated in FIG. 5a. The configuration of reflector 106 in a direction transverse to the scan direction is substantially elliptical. It is noted that substantially elliptical curvatures need not be maintained in this plane. That is this curvature could be straightened out more and made essentially flat, but whatever the shape of the reflector 106 in this plane, no light goes in the operator's eyes. A substantially elliptical curvature is desired however to produce a narrow light. Any light going toward the reflector 106 is directed straight up to the footprint area on line 108 with light not going toward reflector 106 being intercepted by shield 104. This light is either absorbed or reflected back toward the source 102. The side view of reflector 106 is shown in FIG. 5b as it might be incorporated in a copier.

Advantages of this version, as well as the others include the fact that all light emanating from the illumination system is radiated in a perpendicular fashion with respect to the scan direction and no light is radiated obliquely toward an operator or someone else standing at the side of a machine. With respect to the third version in FIGS. 5a and 5b, as well as the other versions, a compact source of light is advantageous since this permits the use of high-intensity discharge lamps or the more efficient projector type of lamp, such as a tungsten lamp. This also permits easier focusing since only one compact light source need be positioned. By proper variation of the width of the reflector, the light intensity may be controlled to any desired distribution, for example, in order to compensate for the Cosine Fourth Power Law diminution of light in the system. Also, for versions one and two, a specially contoured mask may be positioned in the path of the collimated beam of light from reflector 67 to 65. The characteristic of the reflectors in all versions enables the establishment of a narrow line of light without using apertures. The systems described herein may be positioned in any direction of scan relative to the operator, and still keep light from the eyes of the operator. As an example, this would apply to someone standing at the side of a front to back scanning machine. It is noted that the reflector elements may be formed of heat transmitting material thereby keeping heat off of the document area. In addition, the spectral characteristics of the light going to the document may be tailored to the specific requirements of the application.

While the invention has been particularly shown and described with reference to a number of embodiments thereof, it should be understood by those skilled in the art that various changes in form and detail may be made without departing from the spirit and scope of the invention.

What is claimed is:

1. An illumination system for establishing a line of light substantially coextensive with a linear exposure station having a predetermined finite length within a light zone, comprising:

a light source;

a paraboloid reflector formed to receive light from said source and to project in a first light path a beam of light of substantially rectangular cross-section having a relatively long first dimension and a relatively short second dimension, said relatively long dimension corresponding to said predetermined finite length;

a parabolic reflector formed to receive said substantially rectangular beam of light and to project a line of light therefrom corresponding to said predetermined finite length;

first means mounting said light source and said paraboloid reflector in order to project said substantially rectangular beam of light to said parabolic reflector in said first light path and within said light zone; and second means mounting said parabolic reflector to re-form and re-direct along a second path said substantially rectangular beam of light as a line of light of said predetermined finite length and to project said line of light to said exposure station, whereby light is confined essentially within said light path and light scattering is minimized.

2. The system of claim 1 wherein exposure is required in an exposure plane and wherein said first means mounts said paraboloid reflector to direct said beam of light in a light path that is parallel to said exposure plane, and further comprising:

moving means for reciprocating said mounted parabolic reflector in said first light path and in a substantially parallel plane with respect to said exposure plane, in order to move said line of light in said exposure plane during reciprocation of said parabolic reflector.

3. The system of claim 2 wherein said exposure plane accomodates an original document in a copier and wherein reciprocation of said parabolic reflector is performed in order to scan said original document and project information from said document for copying purposes.

4. The system of claim 1 wherein said parabolic reflector comprises a pair of parabolic reflectors and further comprising:

means mounting said pair of parabolic reflectors for reduction of light to said exposure station at different angles to minimize shadow effects.

*5. An illumination system for establishing a line of light substantially coextensive with a linear exposure station having a predetermined finite length within a light zone, comprising:*

*a light source;*

*a paraboloid reflector formed to receive light from said source and to project in a first light path a beam of*

*light of substantially rectangular cross-section having a relatively long first dimension and a relatively short second dimension, said relatively long dimension corresponding to said predetermined finite length;*

*a second reflector formed to receive said substantially rectangular beam of light and to project a line of light therefrom corresponding to said predetermined finite length;*

*first means mounting said light source and said paraboloid reflector in order to project said substantially rectangular beam of light to said second reflector in said first light path and within said light zone; and*

*second means mounting said second reflector to reform and re-direct along a second path said substantially rectangular beam of light as a line of light of said predetermined finite length and to project said line of light to said exposure station, whereby light is confined essentially within said light path and light scattering is minimized.*

*6. The system of claim 5 wherein exposure is required in an exposure plane and wherein said first means mounts said paraboloid reflector to direct said beam of light in a light path that is parallel to said exposure plane, and further comprising:*

*moving means for reciprocating said mounted second reflector in said first light path and in a substantially parallel plane with respect to said exposure plane, in order to move said line of light in said exposure plane during reciprocation of said second reflector.*

*7. The system of claim 6 wherein said exposure plane accomodates an original document in a copier and wherein reciprocation of said second reflector is performed in order to scan said original document and project information from said document for copying purposes.*

* * * * *